US009871592B2

United States Patent
Zhou et al.

(10) Patent No.: US 9,871,592 B2
(45) Date of Patent: Jan. 16, 2018

(54) DATA TRANSMISSION METHOD, APPARATUS, AND SYSTEM

(71) Applicant: Huawei Technologies Co., Ltd., Shenzhen (CN)

(72) Inventors: Jun Zhou, Shenzhen (CN); Peng Lan, Shanghai (CN); Jueping Wang, Shanghai (CN); Si Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 322 days.

(21) Appl. No.: 14/570,993

(22) Filed: Dec. 15, 2014

(65) Prior Publication Data

US 2015/0110497 A1 Apr. 23, 2015

Related U.S. Application Data

(63) Continuation of application No. PCT/CN2013/077295, filed on Jun. 17, 2013.

(30) Foreign Application Priority Data

Jun. 15, 2012 (CN) .......................... 2012 1 0198860

(51) Int. Cl.
*H04J 14/00* (2006.01)
*H04J 14/02* (2006.01)
(Continued)

(52) U.S. Cl.
CPC ....... *H04B 10/25753* (2013.01); *H04B 10/25* (2013.01); *H04B 10/27* (2013.01); *H04B 10/29* (2013.01); *H04W 88/085* (2013.01)

(58) Field of Classification Search
USPC ................................ 398/116, 43, 48, 66, 95
See application file for complete search history.

(56) References Cited

U.S. PATENT DOCUMENTS 5,363,229 A * 11/1994 Sakurai .............. H04B 10/1149
398/119
6,895,185 B1 5/2005 Chung et al.
(Continued)

FOREIGN PATENT DOCUMENTS

CN 1816181 A 8/2006
CN 101166064 A 4/2008
(Continued)

OTHER PUBLICATIONS

Bakaul, M. et al., "Hybrid Multiplexing of Multiband Optical Access Technologies Towards an Integrated DWDM Network," IEEE Photonics Technology Letters, vol. 18, No. 21, Nov. 1, 2006, pp. 2311-2313.

*Primary Examiner* — David Payne
*Assistant Examiner* — Pranesh Barua
(74) *Attorney, Agent, or Firm* — Slater Matsil, LLP

(57) ABSTRACT

The present invention discloses a data transmission method. The method includes: receiving, by a data processing apparatus, at least two data flows transmitted from at least two remote base stations among multiple remote base stations, aggregating the at least two data flows into one flow of output data, and transmitting the output data to a central site device; or receiving, by the data processing apparatus, one flow of synthetic input data transmitted from the central site device, restoring the synthetic input data to at least two data flows before synthesis, and transmitting the restored at least two data flows to corresponding remote base stations.

12 Claims, 9 Drawing Sheets

(51) Int. Cl.
*H04B 10/00* (2013.01)
*H04B 10/2575* (2013.01)
*H04B 10/25* (2013.01)
*H04B 10/29* (2013.01)
*H04B 10/27* (2013.01)
*H04W 88/08* (2009.01)

(56) References Cited

U.S. PATENT DOCUMENTS

| | | | | |
|---|---|---|---|---|
| 7,016,608 B1* | 3/2006 | Ball | | H04J 14/0204 398/58 |
| 8,238,751 B1* | 8/2012 | Iannone | | H04B 10/2503 385/24 |
| 8,761,174 B2* | 6/2014 | Jing | | H04L 47/2441 370/392 |
| 2003/0072055 A1 | 4/2003 | Mickelsson et al. | | |
| 2004/0228636 A1* | 11/2004 | Pathak | | H03L 7/18 398/155 |
| 2005/0074238 A1* | 4/2005 | Sung | | H04L 47/10 398/58 |
| 2006/0018657 A1* | 1/2006 | Oron | | H04J 3/1694 398/66 |
| 2006/0104638 A1* | 5/2006 | Chung | | H04J 14/0226 398/71 |
| 2006/0127087 A1* | 6/2006 | Kasai | | H04J 14/0226 398/45 |
| 2007/0116046 A1 | 5/2007 | Liu et al. | | |
| 2007/0177552 A1* | 8/2007 | Wu | | H04W 88/08 370/335 |
| 2007/0183778 A1* | 8/2007 | Jung | | H04J 14/0226 398/72 |
| 2007/0189773 A1* | 8/2007 | Jung | | H04J 14/0226 398/72 |
| 2008/0193132 A1* | 8/2008 | Matsui | | H04B 10/272 398/79 |
| 2008/0232807 A1* | 9/2008 | Lee | | H04L 12/66 398/87 |
| 2009/0067832 A1* | 3/2009 | DeLew | | H04B 10/272 398/25 |
| 2009/0180426 A1* | 7/2009 | Sabat | | H04W 88/085 370/328 |
| 2009/0202245 A1* | 8/2009 | Bouda | | H04J 14/0226 398/76 |
| 2009/0245228 A1* | 10/2009 | Osterling | | H04J 3/0638 370/350 |
| 2010/0046945 A1* | 2/2010 | Lee | | H04J 14/0226 398/68 |
| 2010/0156930 A1* | 6/2010 | Ghyme | | G06Q 30/06 345/619 |
| 2010/0158523 A1* | 6/2010 | Han | | H04J 14/0282 398/68 |
| 2010/0158524 A1* | 6/2010 | Kwon | | G02B 6/124 398/70 |
| 2010/0266283 A1* | 10/2010 | Beckett | | H04J 14/02 398/68 |
| 2011/0064410 A1* | 3/2011 | Beckett | | H04J 14/02 398/63 |
| 2011/0080834 A1* | 4/2011 | Hirota | | H04L 47/10 370/236 |
| 2011/0243071 A1* | 10/2011 | Wu | | H04W 88/085 370/328 |
| 2011/0274101 A1* | 11/2011 | Cooper | | H04B 3/46 370/338 |
| 2012/0057572 A1 | 3/2012 | Evans et al. | | |
| 2012/0057875 A1* | 3/2012 | Nagarajan | | H04J 14/0246 398/82 |
| 2012/0106963 A1* | 5/2012 | Huang | | H04Q 11/0067 398/66 |
| 2012/0251108 A1* | 10/2012 | Chen | | H04J 14/0282 398/49 |
| 2012/0275787 A1* | 11/2012 | Xiong | | H04L 49/357 398/45 |
| 2013/0004176 A1* | 1/2013 | Sato | | H04B 10/25754 398/96 |
| 2013/0071123 A1* | 3/2013 | Lee | | H04B 10/572 398/82 |
| 2013/0077971 A1* | 3/2013 | Suehiro | | H04L 7/0331 398/52 |
| 2013/0089336 A1* | 4/2013 | Dahlfort | | H04J 14/0282 398/115 |
| 2013/0183039 A1* | 7/2013 | Hood | | H04J 14/0234 398/72 |
| 2014/0003806 A1* | 1/2014 | Urban | | G01M 11/3127 398/21 |
| 2014/0072303 A1* | 3/2014 | Pfau | | H04J 14/06 398/65 |
| 2014/0355991 A1* | 12/2014 | Cameirao | | H04B 10/2575 398/79 |
| 2015/0063803 A1* | 3/2015 | Ciaramella | | H04J 14/0246 398/49 |
| 2015/0086209 A1* | 3/2015 | Laraqui | | H04B 10/2575 398/115 |

FOREIGN PATENT DOCUMENTS

| | | |
|---|---|---|
| CN | 101841748 A | 9/2010 |
| CN | 102723994 A | 10/2012 |
| EP | 2056495 A1 | 5/2009 |
| EP | 2373116 A1 | 10/2011 |
| JP | 2003258802 A | 9/2003 |
| JP | 200456821 A | 2/2004 |
| JP | 200694446 A | 4/2006 |
| JP | 200872714 A | 3/2008 |
| JP | 200933226 A | 2/2009 |
| KR | 20100020350 A | 2/2010 |
| KR | 1020110135405 A | 12/2011 |
| WO | 2006040653 A1 | 4/2006 |
| WO | 2011129102 A1 | 10/2011 |

* cited by examiner

DATA TRANSMISSION METHOD, APPARATUS, AND SYSTEM

This application is a continuation of International Application No. PCT/CN2013/077295, filed on Jun. 17, 2013, which claims priority to Chinese Patent Application No. 201210198860.1, filed on Jun. 15, 2012, both of which are hereby incorporated by reference in their entireties.

TECHNICAL FIELD

The present invention relates to the field of communications technologies, and in particular, to a method, an apparatus, and a system for transmitting data.

BACKGROUND

As areas where users are located become wider and wider, remote base stations have gradually evolved from conventional macro base stations to distributed remote base stations. With regard to distributed remote base stations, a common public radio interface (CPRI) data connection is achieved between a remote radio unit (RRU) and a baseband unit (BBU) by using direct driving through an optical fiber. As remote base stations are developing toward a cloud radio access network, BBUs are centralized on scale to form a baseband unit pool (BBU pool) and RRUs of multiple remote base stations share BBU resources, where the remote base stations are geographically distributed. As shown in FIG. 1, each remote base station is connected to a BBU through one optical fiber or one pair of optical fibers and data is transmitted in a point-to-point manner, which requires a large amount of optical fibers.

SUMMARY

Embodiments of the present invention provide a data transmission method, which reduces the required amount of optical fibers. In addition, the embodiments of the present invention provide a data processing apparatus and a system.

A data transmission method is provided, where a data processing apparatus is connected to multiple remote base stations and one central site device, where the data processing apparatus is connected to each remote base station through one optical fiber or one pair of optical fibers, and the data processing apparatus is connected to the central site device through one optical fiber or one pair of optical fibers, and the method includes: receiving, by the data processing apparatus, at least two data flows transmitted from at least two remote base stations among the multiple remote base stations, aggregating the at least two data flows into one flow of output data, and transmitting the output data to the central site device; or receiving, by the data processing apparatus, one flow of synthetic input data transmitted from the central site device, restoring the synthetic input data to at least two data flows before synthesis, and transmitting, according to a sub-interface identity in each restored data flow and through sub-interfaces corresponding to the sub-interface identities, the restored at least two data flows to remote base stations that are connected to the sub-interfaces through optical fibers.

A data processing apparatus includes multiple or multiple pairs of sub-interfaces and at least one synthesis interface or one pair of synthesis interfaces, where each sub-interface or each pair of sub-interfaces has a unique sub-interface identity, each remote base station is connected to one sub-interface or one pair of sub-interfaces through one optical fiber or one pair of optical fibers, and a central site device is connected to one synthesis interface or one pair of the synthesis interfaces through one optical fiber or one pair of optical fibers. The sub-interfaces are configured to receive data transmitted from remote base stations that are connected to the sub-interfaces through optical fibers. A data processing unit is configured to aggregate at least two data flows received by the at least two sub-interfaces into one flow of output data. The synthesis interface is configured to transmit the output data synthesized by the data processing unit to the central site device that is connected through an optical fiber to the synthesis interface. The synthesis interface is further configured to receive one flow of synthetic input data transmitted from the central site device. The data processing unit is further configured to restore the synthetic input data received by the synthesis interface to at least two data flows before synthesis. The sub-interfaces are further configured to transmit, according to a sub-interface identity in each restored data flow, the at least two data flows restored by the data processing unit to remote base stations that are connected to the sub-interfaces through optical fibers.

A data transmission system includes multiple remote base stations, one data processing apparatus, and one central site device, where the central site device integrates one built in data processing apparatus. The data processing apparatus is connected to each remote base station through one optical fiber or one pair of optical fibers and the data processing apparatus is connected to the central site device through one optical fiber or one pair of optical fibers. The data processing apparatus is configured to receive at least two data flows transmitted from at least two remote base stations among the multiple remote base stations, aggregate the at least two data flows into one flow of output data, and transmit the output data to the central site device. The central site device is configured to receive the output data transmitted from the data processing apparatus, restore the output data to the at least two data flows before synthesis, and then recognize the at least two data flows, so as to implement communication between the central site device and the remote base stations. The central site device is further configured to aggregate two data flows transmitted to at least two remote base stations connected to the data processing apparatus into one flow, and transmit the aggregated synthetic input data to the data processing apparatus. The data processing apparatus is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

A data transmission system includes multiple remote base stations, one first data processing apparatus, and one central site device, where the central site device integrates one second data processing apparatus. The first data processing apparatus is connected to each remote base station through one optical fiber or one pair of optical fibers and the first data processing apparatus is connected to the central site device through one optical fiber or one pair of optical fibers. The first data processing apparatus is configured to receive at least two data flows transmitted from at least two remote base stations among the multiple remote base stations, aggregate the at least two data flows into one flow of output data, and transmit the output data to the central site device. The second data processing apparatus is configured to receive the output data transmitted from the first data processing apparatus, restore the output data to the at least two data flows before synthesis, and then recognize the at least two data flows, so as to implement communication between the central site device and the remote base stations. The second data processing apparatus is further configured to aggregate two data flows to be transmitted by the central site device to at least two remote base stations connected to the first data processing apparatus into one flow, and transmit the aggregated synthetic input data to the first data processing apparatus. The first data processing apparatus is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

A data transmission system includes multiple remote base stations, multiple first data processing apparatuses, and one central site device, where the central site device integrates one second data processing apparatus. Each first data processing apparatus is connected to multiple remote base stations and each remote base station is connected to only one first data processing apparatus, each first data processing apparatus and a remote base station are connected through one optical fiber or one pair of optical fibers, and each first data processing apparatus is connected to the central site device through one optical fiber or one pair of optical fibers. The first data processing apparatus is configured to receive at least two flows of data transmitted from at least two remote base stations among multiple remote base stations that are connected to the first data processing apparatus, aggregate the at least two data flows into one flow of output data, and transmit the output data to the central site device. The second data processing apparatus is configured to receive the output data transmitted from the first data processing apparatus, restore the output data to the at least two data flows before synthesis, and then recognize the at least two data flows, so as to implement communication between the central site device and the remote base stations. The second data processing apparatus is further configured to aggregate two data flows, which are transmitted by the central site device to at least two remote base stations connected to one of the first data processing apparatus, into one flow, and transmit the aggregated synthetic input data to the first data processing apparatus connected to the at least two remote base stations. The first data processing apparatus is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

A data transmission system includes multiple remote base stations, one first data processing apparatus, one second data processing apparatus, and one central site device, where the second data processing apparatus is set externally to the central site device, and there is a communication connection between the central site device and the second data processing apparatus. The first data processing apparatus is connected to each remote base station through one optical fiber or one pair of optical fibers and the first data processing apparatus is connected to the second data processing apparatus through one optical fiber or one pair of optical fibers. The first data processing apparatus is configured to receive at least two data flows transmitted from at least two remote base stations among the multiple remote base stations, aggregate the at least two data flows into one flow of output data, and transmit the output data to the second data processing apparatus. The second data processing apparatus is configured to receive the output data transmitted from the first data processing apparatus, restore the output data to the at least two data flows before synthesis, and then recognize the at least two data flows, so as to implement communication between the central site device and the remote base stations. The second data processing apparatus is further configured to aggregate two data flows to be transmitted by the central site device to at least two remote base stations into one flow, and transmit the aggregated synthetic input data to the first data processing apparatus. The first data processing apparatus is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

A data transmission system includes multiple remote base stations, multiple first data processing apparatuses, one second data processing apparatus, and one central site device, where the second data processing apparatus is set externally to the central site device, and there is a communication connection between the central site device and the second data processing apparatus. Each first data processing apparatus is connected to multiple remote base stations and each remote base station is connected to only one first data processing apparatus, each first data processing apparatus and a remote base station are connected through one optical fiber or one pair of optical fibers, and each first data processing apparatus is connected to the second data processing apparatus through one optical fiber or one pair of optical fibers. The first data processing apparatus is configured to receive at least two data flows transmitted from at least two remote base stations among multiple remote base stations connected to the first data processing apparatus, aggregate the at least two data flows into one flow of output data, and transmit the output data to the second data processing apparatus. The second data processing apparatus is configured to receive the output data transmitted from the first data processing apparatus, restore the output data to the at least two data flows before synthesis, and then recognize the at least two data flows, so as to implement communication between the central site device and the remote base stations. The second data processing apparatus is further configured to aggregate two data flows to be transmitted by the central site device to at least two remote base stations connected to one first data processing apparatus into one flow, and transmit the aggregated synthetic input data to the first data processing apparatus connected to the at least two remote base stations. The first data processing apparatus is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations which are connected to the sub-interfaces through optical fibers.

In the embodiments of the present invention, a data processing apparatus is connected to multiple remote base stations and one central site device, where the data processing apparatus is connected to each remote base station through one optical fiber or one pair of optical fibers, and the data processing apparatus is connected to the central site device through one optical fiber or one pair of optical fibers, and the method includes: receiving, by the data processing apparatus, at least two data flows transmitted from at least two remote base stations among the multiple remote base stations, aggregating the at least two data flows into one flow of output data, and transmitting the output data to the central site device; or receiving, by the data processing apparatus, one flow of synthetic input data transmitted from the central site device, restoring the synthetic input data to at least two data flows before synthesis, and transmitting, according to a sub-interface identity of each restored data flow and through sub-interfaces corresponding to the sub-interface identities, the restored at least two data flows to remote base stations that are connected to the sub-interfaces through optical fibers. Compared with the prior art where each remote base station is connected to a central site device through one optical fiber or one pair of optical fibers, the data transmission solutions provided in the embodiments of the present invention may greatly reduce the required amount of optical fibers by using a data processing apparatus to process data when remote base stations are far (for example, hundreds of meters or even a few kilometers) from a central site device in a cloud radio access network, where the data processing apparatus is connected to each remote base station through one optical fiber or one pair of optical fibers and connected to the central site device through one optical fiber or one pair of optical fibers.

DETAILED DESCRIPTION OF ILLUSTRATIVE EMBODIMENTS

Embodiments of the present invention provide a data transmission method, which reduces the required amount of optical fibers. In addition, the embodiments of the present invention provide a data processing apparatus and a system. The method, apparatus and system are described separately in detail.

A central site device in the embodiments of the present invention may be a baseband unit (BBU) or a device with centralized BBUs, and a remote base station may include a remote radio unit (RRUit) and/or a device providing a power supply to an RRU.

Figure 1:
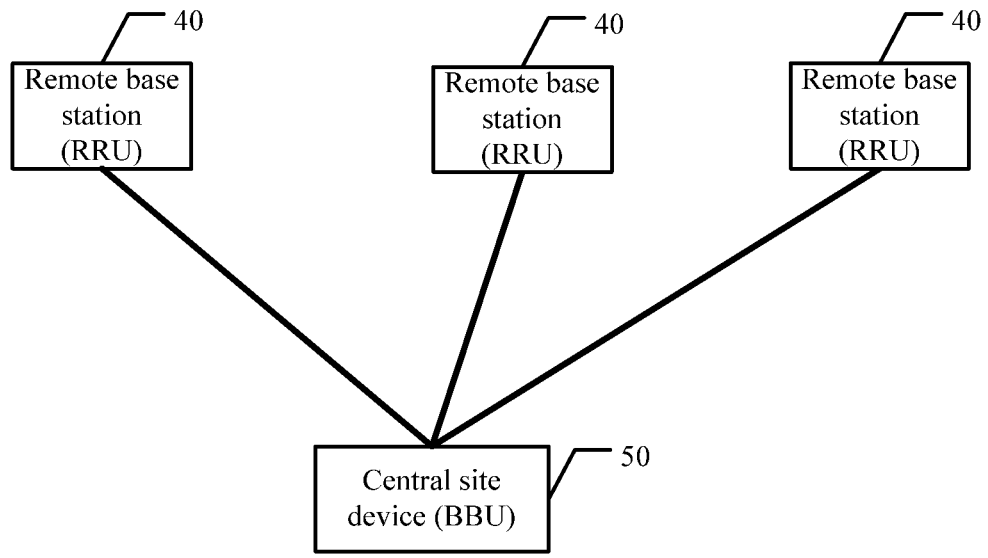
FIG. 1 is a structural diagram of a data transmission architecture in the prior art.

Referring to FIG. 1, FIG. 1 is a schematic diagram illustrating connections between remote base stations and a central site device in the prior art. As shown in FIG. 1, each remote base station 40 is connected to a central site device 50 through one optical cable or one pair of optical fibers. When the remote base stations are kilometers away from the central site device, a large quantity of optical fibers need to be used.

Figure 2:
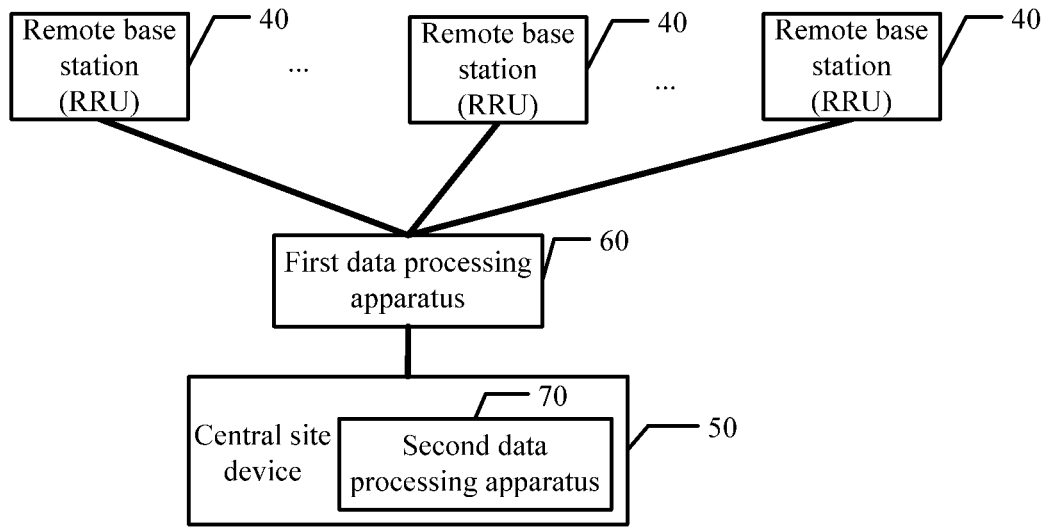
FIG. 2 is a schematic diagram of a system according to an embodiment of the present invention.

Referring to FIG. 2, one embodiment of a data transmission system provided by the embodiments of the present invention includes: multiple remote base stations 40, one first data processing apparatus 60, and one central site device 50. The central site device 50 integrates one second data processing apparatus 70. The second data processing apparatus 70 is the same as the first data processing apparatus 60 in terms of both structure and functions, but executes a data processing process reverse to the process executed by the first data processing apparatus 60.

The first data processing apparatus 60 is connected to each remote base station 40 through one optical fiber or one pair of optical fibers and the first data processing apparatus 60 is connected to the central site device 50 through one optical fiber or one pair of optical fibers.

The first data processing apparatus 60 is configured to receive at least two data flows transmitted from at least two remote base stations among the multiple remote base stations, aggregate the at least two data flows into one flow of output data, and transmit the output data to the central site device.

The second data processing apparatus 70 is configured to receive the output data transmitted from the first data processing apparatus, restore the output data to the at least two data flows before synthesis, and then recognize the at least two data flows, so as to implement communication between the central site device and the remote base stations.

The second data processing apparatus 70 is further configured to aggregate two data flows transmitted to at least two remote base stations connected to the first data processing apparatus into one flow, and transmit the aggregated synthetic input data to the first data processing apparatus.

The first data processing apparatus 60 is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

The first data processing apparatus 60 is connected to the multiple remote base stations 40 and the central site device 50, where the first data processing apparatus 60 is connected to each remote base station 40 through one optical fiber or one pair of optical fibers, and the first data processing apparatus 60 is connected to the central site device 50 through one optical fiber or one pair of optical fibers. In this way, when the remote base stations 40 are far from the central site device 50, the first data processing apparatus 60 and the central site device 50 are connected through only one optical fiber or one pair of optical fibers, thereby greatly reducing the required amount of optical fibers.

In the embodiment of the present invention, one optical fiber is one physical optical fiber that can both receive and transmit signals. One pair of optical fibers are two physical optical fibers, where one of the two optical fibers is used to receive signals and the other is used to transmit signals.

The first data processing apparatus 60 fulfills mainly two purposes in the data transmission system, namely, data aggregation and data splitting.

In a data aggregation process, the first data processing apparatus 60 is configured to receive at least two data flows transmitted from at least two remote base stations connected to the first data processing apparatus 60, aggregate the at least two data flows into one flow of output data, and transmit the output data to the central site device; and the central site device 50 is configured to receive the output data transmitted from the first data processing apparatus 60, restore the output data to the at least two data flows before synthesis, and recognize the at least two data flows, so as to implement communication between the central site device 50 and the remote base stations 40.

In a data splitting process, the second data processing apparatus 70 in the central site device 50 aggregates two data flows transmitted to at least two remote base stations that are connected to the first data processing apparatus 60, and transmits the aggregated synthetic input data to the first data processing apparatus 60 that is connected to the at least two remote base stations 40; and the first data processing apparatus 60 receives the synthetic input data transmitted from the central site device 50, restores the synthetic input data to the at least two data flows before synthesis, and transmits, according to a sub-interface identity in each restored data flow and through sub-interfaces corresponding to the sub-interface identities, the restored at least two data flows to the remote base stations that are connected to the sub-interfaces through optical fibers.

In an implementation scenario of the embodiment of the present invention, the central site device 50 in the embodiment of the present invention integrates the second data processing apparatus 70, and the second data processing apparatus 70 integrated to the central site device 50 executes a data processing process reverse to the process executed by the first data processing apparatus 60. After the first data processing apparatus 60 aggregates at least two data flows into synthetic data, the first data processing apparatus 60 transmits the synthetic data to the central site device 50, and the second data processing apparatus 70 integrated to the central site device 50 restores the synthetic data to the at least two data flows before synthesis, so that the central site device 50 recognizes information of each remote base station 40. Conversely, when the central site device 50 needs to transmit data to at least two remote base stations, the integrated second data processing apparatus 70 aggregates the at least two data flows to be transmitted into one flow of synthetic input data, and then transmits the synthetic input data to the first data processing apparatus 60. The first data processing apparatus 60 then executes a process of splitting the synthetic data and transmits the restored at least two data flows to the corresponding remote base stations 40.

Figure 3:
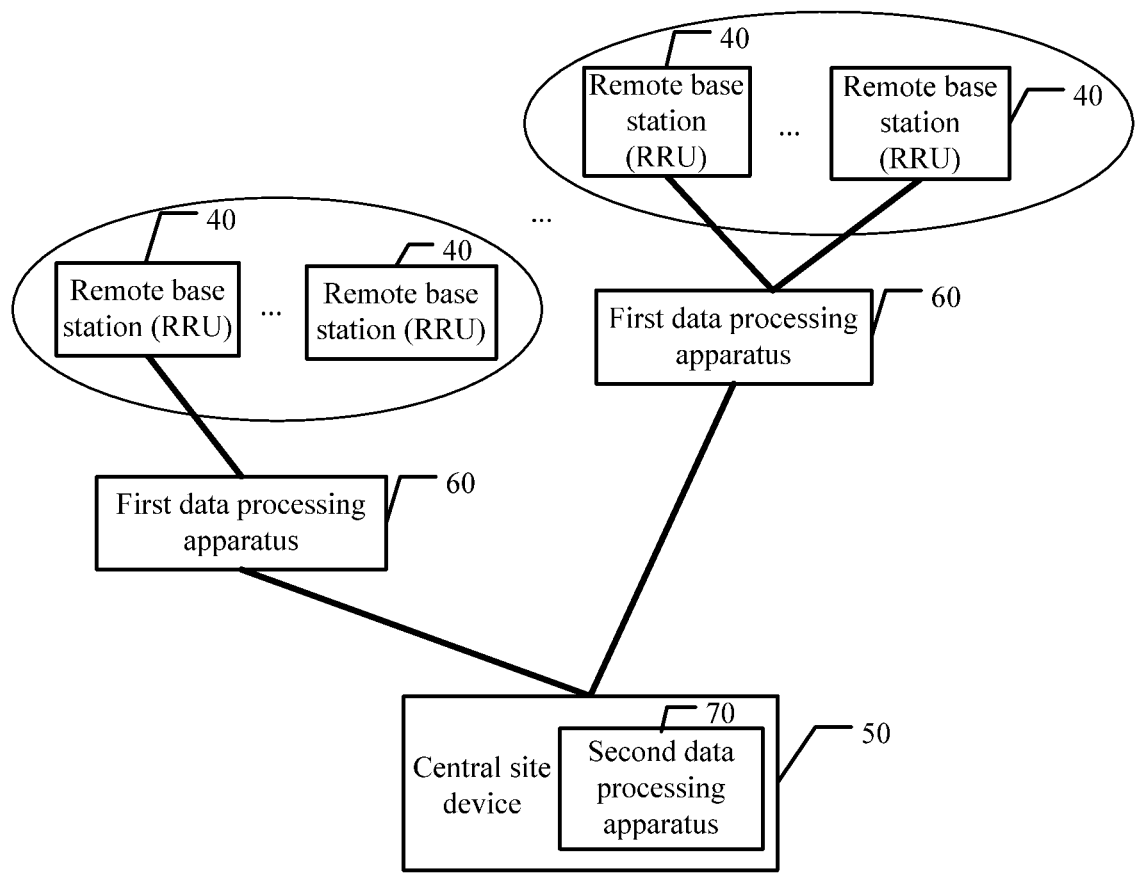
FIG. 3 is a schematic diagram of a system according to another embodiment of the present invention.

Referring to FIG. 3, another embodiment of the data transmission system provided in the embodiments of the present invention includes multiple remote base stations 40, multiple first data processing apparatuses 60, and one central site device 50, where the central site device 50 integrates one second data processing apparatus 70.

Each first data processing apparatus 60 is connected to multiple remote base stations 40 and each remote base station is connected to only one first data processing apparatus 60. Each first data processing apparatus 60 and a remote base station 40 are connected through one optical fiber or one pair of optical fibers, and each first data processing apparatus 60 is connected to the central site device 50 through one optical fiber or one pair of optical fibers.

The first data processing apparatus 60 is configured to receive at least two data flows transmitted from at least two remote base stations among the multiple remote base stations connected to the first data processing apparatus 60, aggregate the at least two data flows into one flow of output data, and transmit the output data to the central site device.

The second data processing apparatus is configured to receive the output data transmitted from the first data processing apparatus, restore the output data to the at least two data flows before synthesis, and then recognize the at least two data flows, so as to implement communication between the central site device and the remote base stations.

The second data processing apparatus 70 is further configured to aggregate two data flows, which are transmitted by the central site device to at least two remote base stations connected to one first data processing apparatus, into one flow, and transmit the aggregated synthetic input data to the first data processing apparatus connected to the at least two remote base stations.

The first data processing apparatus 60 is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

Each first data processing apparatus 60 is connected to multiple remote base stations 40 and each remote base station 40 is connected to only one first data processing apparatus 60. Each first data processing apparatus 60 and a remote base station are connected through one optical fiber or one pair of optical fibers, and each first data processing apparatus 60 is connected to the central site device 50 through one optical fiber or one pair of optical fibers.

When there are many remote base stations and some of them are concentrated in a local geographical area, the solution provided in the embodiment can be used to carry out a deployment. In this way, when the remote base stations 40 are far from the central site device 50, the first data processing apparatus 60 and the central site device 50 are connected through only one optical fiber or one pair of optical fibers, thereby greatly reducing the required amount of optical fibers.

In the embodiment of the present invention, multiple first data processing apparatuses 60 may be deployed and one first data processing apparatus 60 is deployed for multiple remote base stations that are concentrated in a local geographical area. The functions of a first data processing apparatus 60 is the same as the first data processing apparatus 60 in the embodiment corresponding to FIG. 2 and therefore are not described in detail again.

When there are multiple first data processing apparatuses 60 to be connected to the central site device 50 and each of the first data processing apparatuses 60 is very far from the central site device 50, it is practical to first connect the first data processing apparatuses 60 to be connected to the central site device 50 to an apparatus of transparently transmitting data processing and then connect the apparatus of transparently transmitting data processing to the central site device 50, thereby further reducing the required amount of optical fibers.

The apparatus of transparently transmitting data processing may have a same function as the first data processing apparatus 60, provided that the an apparatus of transparently transmitting data processing is a module/device that fulfills a transparent transmission/relay purpose in such a scenario, so that the required amount of optical fibers is further reduced.

Figure 4:
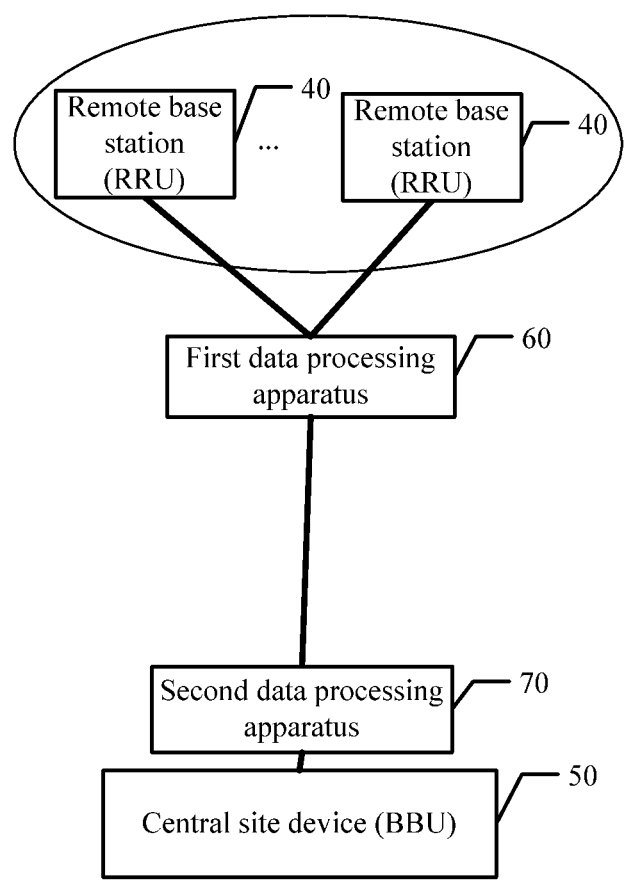
FIG. 4 is a schematic diagram of a system according to another embodiment of the present invention.

Referring to FIG. 4, another embodiment of the data transmission system provided in the embodiments of the present invention includes multiple remote base stations 40, one first data processing apparatus 60, one second data processing apparatus 70 and one central site device 50, where there is a communication connection between the central site device 50 and the second data processing apparatus 70. In an implementation scenario, the second data processing apparatus 70 may be set externally to the central site device 50.

The first data processing apparatus 60 is connected to each remote base station 40 through one optical fiber or one pair of optical fibers and the first data processing apparatus 60 is connected to the second data processing apparatus 70 through one optical fiber or one pair of optical fibers.

The first data processing apparatus 60 is configured to receive at least two data flows transmitted from at least two remote base stations among the multiple remote base stations, aggregate the at least two data flows into one flow of output data, and transmit the output data to the second data processing apparatus.

The second data processing apparatus 70 is configured to receive the output data transmitted from the first data processing apparatus, restore the output data to the at least two data flows before synthesis, and then recognize the at least two data flows, so as to implement communication between the central site device and the remote base stations.

The second data processing apparatus 70 is further configured to aggregate two data flows to be transmitted by the central site device 50 to at least two remote base stations connected to the first data processing apparatus into one flow, and transmit the aggregated synthetic input data to the first data processing apparatus.

The first data processing apparatus 60 is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

The first data processing apparatus 60 is connected to each remote base station 40 through one optical fiber or one pair of optical fibers and the first data processing apparatus 60 is connected to the second data processing apparatus 70 through one optical fiber or one pair of optical fibers. In this way, when the remote base stations 40 are far from the central site device 50, the first data processing apparatus 60 and the central site device 50 are connected through only one optical fiber or one pair of optical fibers, thereby greatly reducing the required amount of optical fibers.

In the embodiment, the first data processing apparatus 60 and the second data processing apparatus 70 fulfill two purposes in the data transmission system, namely, data aggregation and/or data splitting, and the two data processing apparatuses play reverse roles in a data processing process. For example, after the data processing apparatus 60 aggregates at least two data flows, the data processing apparatus 60 transmits the aggregated synthetic data to the second data processing apparatus 70, and the second data processing apparatus 70 splits the synthetic data. Conversely, after the second data processing apparatus 70 aggregates at least two data flows, the second data processing apparatus 70 transmits the synthetic data to the first data processing apparatus 60, and the first data processing apparatus 60 splits the synthetic data and transmits the restored at least two data flows to corresponding remote base stations 40.

A specific implementation scenario of the embodiment of the present invention is described as follows.

The first data processing apparatus 60 receives at least two data flows transmitted from at least two remote base stations among the multiple remote base stations, aggregates the at least two data flows into one flow of output data, and transmits the output data to the second data processing apparatus; and the second data processing apparatus 70 receives the output data transmitted from the first data processing apparatus 60, restores the output data to the at least two data flows before synthesis, and recognizes the at least two data flows, so as to implement communication between the central site device 50 and the remote base stations 40.

The second data processing apparatus 70 aggregates two data flows transmitted to at least two remote base stations that are connected to the first data processing apparatus 60, and transmits the aggregated synthetic input data to the first data processing apparatus 60 that is connected to the at least two remote base stations; and the first data processing apparatus 60 receives the synthetic input data transmitted from the second data processing apparatus 70, restores the synthetic input data to the at least two data flows before synthesis, and transmits, according to a sub-interface identity in each restored data flow and through sub-interfaces corresponding to the sub-interface identities, the restored at least two data flows to the remote base stations 40 that are connected to the sub-interfaces through optical fibers.

The central site device 50 generates data only for each remote base station 40. After the central site device generates at least two data flows to be transmitted to at least two remote base stations 40, the two data flows are aggregated by the second data processing apparatus 70 into one synthetic input data and then transmitted to the first data processing apparatus 60.

Figure 5:
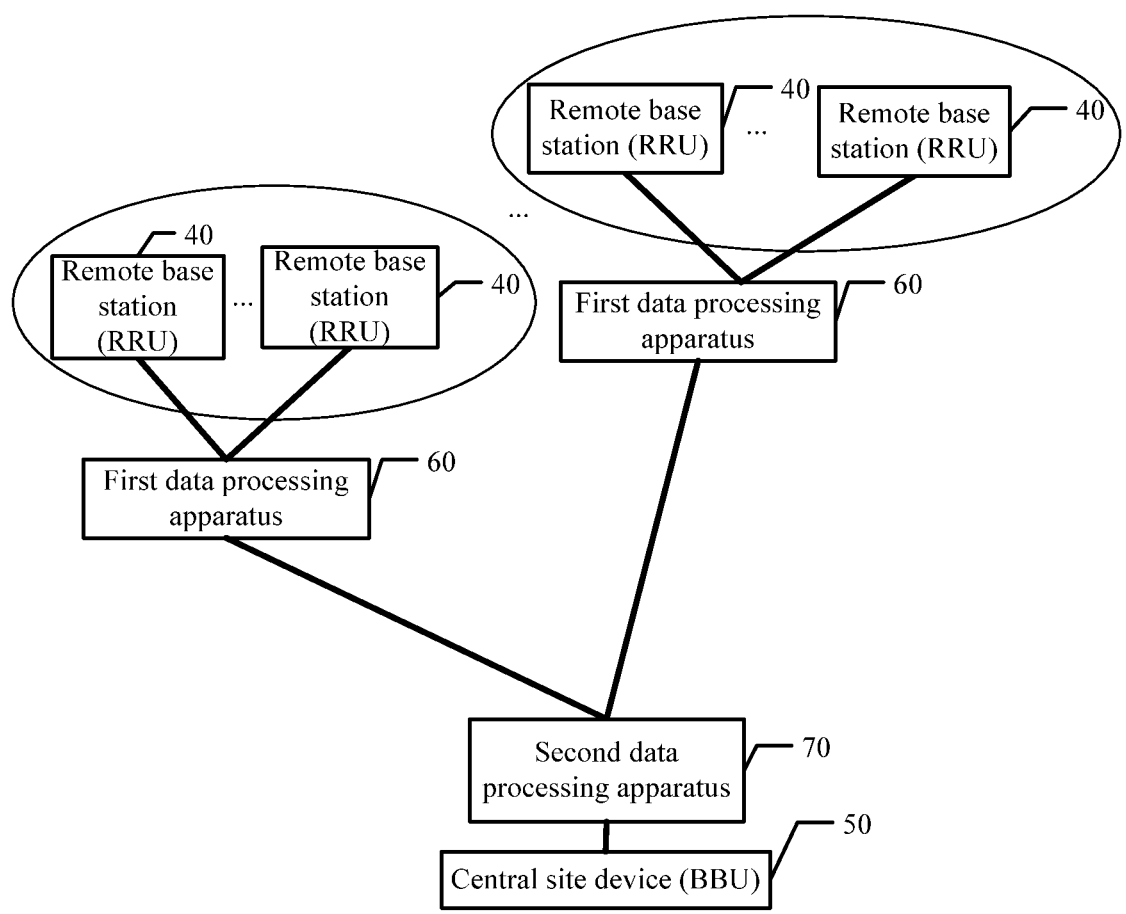
FIG. 5 is a schematic diagram of a system according to another embodiment of the present invention.

Referring to FIG. 5, another embodiment of the data transmission system provided in the embodiments of the present invention includes multiple remote base stations 40, multiple first data processing apparatuses 60, one second data processing apparatus 70 and one central site device 50, where there is a communication connection between the central site device 50 and the second data processing apparatus 70. In an implementation scenario, the second data processing apparatus 70 is set externally to the central site device 50.

Each first data processing apparatus 60 is connected to multiple remote base stations 40 and each remote base station 40 is connected to only one first data processing apparatus 60. Each first data processing apparatus 60 and a remote base station 40 are connected through one optical fiber or one pair of optical fibers, and each first data processing apparatus 60 is connected to the second data processing apparatus 70 through one optical fiber or one pair of optical fibers.

The first data processing apparatus 60 is configured to receive at least two flows of data transmitted from at least two remote base stations among multiple remote base stations that are connected to the first data processing apparatus 60, aggregate the at least two data flows into one flow of output data, and transmit the output data to the second data processing apparatus.

The second data processing apparatus 70 is configured to receive the output data transmitted from the first data processing apparatus, restore the output data to the at least two data flows before synthesis, and then recognize the at least two data flows, so as to implement communication between the central site device and the remote base stations.

The second data processing apparatus 70 is further configured to aggregate two data flows to be transmitted by the central site device to at least two remote base stations connected to one first data processing apparatus into one flow, and transmit the aggregated synthetic input data to the first data processing apparatus connected to the at least two remote base stations.

The first data processing apparatus 60 is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers.

When there are many remote base stations 40 and some of them are concentrated in a local geographical area, the solution provided in the embodiment can be used to carry out a deployment. In this way, when the remote base stations 40 are very far from the central site device 50, the first data processing apparatus 60 and the central site device 50 are connected through only one optical fiber or one pair of optical fibers, thereby greatly reducing the required amount of optical fibers.

In the embodiment of the present invention, multiple first data processing apparatuses 60 may be deployed and one first data processing apparatus 60 is deployed for multiple remote base stations that are concentrated in a local geographical area. The functions of a first data processing apparatus 60 is the same as the first data processing apparatus 60 in the embodiment corresponding to FIG. 4 and therefore are not described in detail again.

Figure 6:
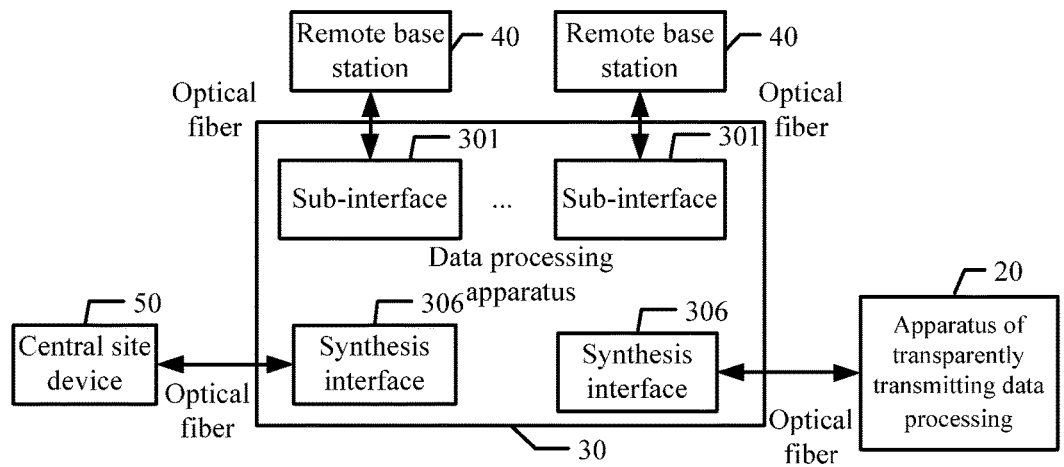
FIG. 6 is a schematic diagram of a system according to another embodiment of the present invention.

Referring to FIG. 6, another embodiment of the data transmission system provided in the embodiments of the present invention is described as follows.

A remote base station 40 is connected to a sub-interface 301 of a data processing apparatus 30 through an optical fiber; at least two data flows from at least two remote base stations 40 enter sub-interfaces 301 separately through optical fibers connected to the data processing apparatus 30. In an uplink direction, the at least two data flows are aggregated by the data processing apparatus and then transmitted through a synthesis interface 306 to a central site device 50 that is connected to the synthesis interface 306 through an optical fiber. Conversely, in a downlink direction, when the central site device 50 needs to transmit at least two data flows to at least two remote base stations 40, a data processing apparatus integrated to the central site device 50 first aggregates the at least two data flows to be transmitted and then the aggregated synthetic data is transmitted to the data processing apparatus 30 through an optical fiber, and then the data processing apparatus 30 splits the synthetic data and transmits the restored at least two data flows to the corresponding remote base stations 40 through different sub-interfaces 301. In FIG. 6, the data processing apparatus 30 may be configured with two synthesis interfaces 306, where one is connected to the central site device 50 and the other is connected to a an apparatus of transparently transmitting data processing 20. The apparatus of transparently transmitting data processing 20 fulfills the following purpose: when there are multiple data processing apparatuses 30 to be connected to the central site device 50 and the multiple data processing apparatuses 30 are all very far from the central site device 50, the multiple data processing apparatuses 30 to be connected to the central device 50 may first be connected to the apparatus of transparently transmitting data processing 20 and then the apparatus of transparently transmitting data processing 20 is connected to the central site device 50 through one optical fiber or one pair of optical fibers, so that the required amount of optical fibers is further reduced.

Figure 7:
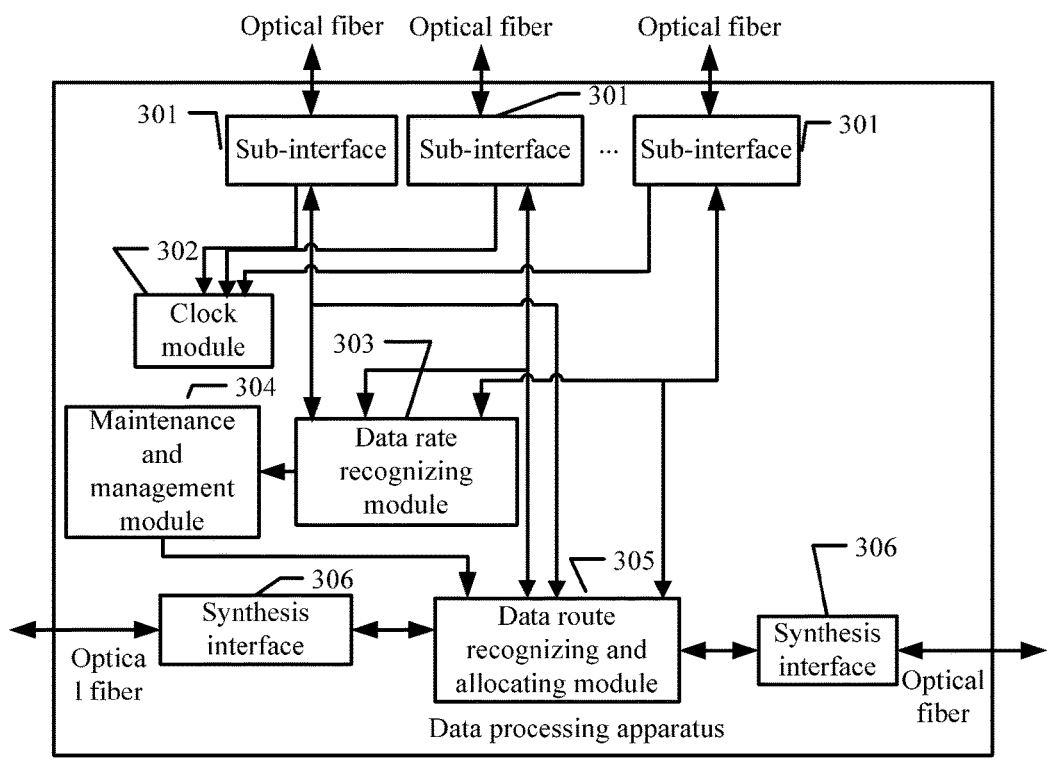
FIG. 7 is a schematic diagram of a system according to another embodiment of the present invention.

Specific processes of data aggregation and data splitting performed by the data processing apparatus 30 are described in detail with reference to FIG. 7.

Figure 8:
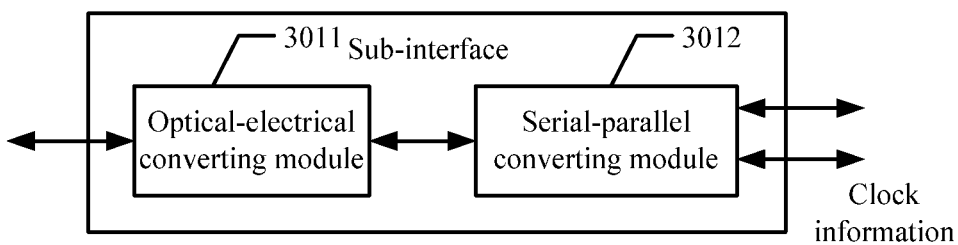
FIG. 8 is a schematic diagram of a system according to another embodiment of the present invention.

A data aggregation process performed by the data processing apparatus 30 is as follows: a sub-interface 301 converts a received optical signal into an electrical signal, converts a serial signal into a parallel signal, and extracts a reference clock of data by using a clock module 302 so as to adjust clock information of each data flow to reference clock information. This process may be understood with reference to FIG. 8, where an optical-electrical converting module 3011 converts a received optical signal into an electrical signal and then a serial-parallel converting module 3012 converts a serial signal into a parallel signal. The clock module 302 extracts clock information from data processed by the sub-interface 301, outputs a reference clock and uses this reference clock as a reference clock to generate a clock required for data processing. The clock information mentioned in the embodiment of the present invention may be a frequency and a phase of a harmonic that carries data. A data rate recognizing module 303 detects a rate of each parallel data flow converted by the sub-interface 301 and generates alarm information when a sum of rates of all data flows is higher than a preset threshold rate of synthetic data; and a management and maintenance module 304 collects the alarm information generated by the data rate recognizing module 303 and transfers the alarm information to a data route recognizing and allocating module 305, where the alarm information is reported to the central site device 50 by the data route recognizing and allocating module 305. When the sum of rates of all data flows is lower than or equal to the preset threshold rate of synthetic data, the management and maintenance module 304 instructs the data route recognizing and allocating module 305 to synthesize multiple data flows into one flow of output data. The synthesis interface 306 converts the synthetic output data from parallel signals into serial signals, converts electrical signals into optical signals, and transmits the optical signals to the central site device 50 through an optical fiber connected to the synthesis interface 306.

A data splitting process performed by the data processing apparatus 30 is described as follows.

The data splitting process is a reverse of the data aggregation process. The central site device 50 is connected to the synthesis interface 306 through an optical fiber. After the synthesis interface 306 receives input synthetic data, the synthesis interface 306 first converts optical signals into electrical signals and converts serial signals into parallel signals; the data route recognizing and allocating module 305 processes the data from the synthesis interface and restores the synthetic data to multiple data flows according to sub-interface identities in the synthetic data; the data rate recognizing module 303 detects rates of the data flows restored by the data route recognizing and allocating module 305 and transfers the rate information to the management and maintenance module 304; and the sub-interface 301 first converts the restored parallel data into serial data, converts optical signals into electrical signals, and transmits the electrical signals to corresponding remote base stations through optical fibers connected to the sub-interface 301.

Figure 9:
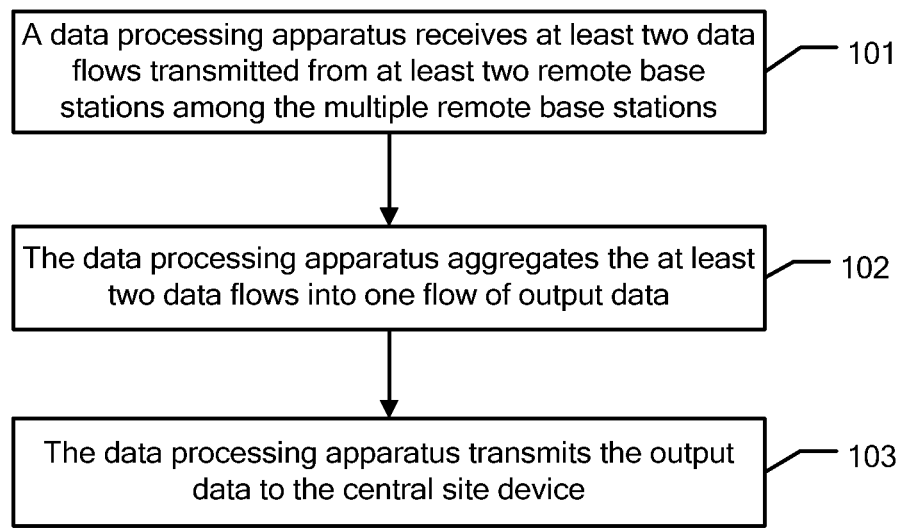
FIG. 9 is a schematic diagram of a data transmission method according to an embodiment of the present invention.

Referring to FIG. 9, the data processing apparatuses disclosed in the preceding embodiments provide both data aggregation and data splitting functions. From the perspective of data aggregation, based on the data processing apparatus disclosed in the preceding embodiment, one embodiment of a data transmission method provided in the embodiments of the present invention includes the following steps.

101. A data processing apparatus receives at least two data flows transmitted from at least two remote base stations among multiple remote base stations.

The data processing apparatus is connected to multiple remote base stations. Multiple remote base stations may transmit data to the data processing apparatus at the same time or at different time. When the data processing apparatus receives at least two data flows transmitted from at least two remote base stations, the data processing apparatus may aggregate the data.

When an optical fiber connecting one remote base station and the data processing apparatus has both receiving and transmitting functions, the data processing apparatus has multiple sub-interfaces, where a sub-identifier of each sub-interface is different. When one remote base station and the data processing apparatus are connected through one pair of optical fibers, where one optical fiber is used for reception and the other optical fiber is used for transmission, the data processing apparatus has multiple pairs of sub-interfaces, where both interfaces in a pair of interfaces has a same sub-interface identity but a pair of interfaces has a sub-interface identity different from every other pair of sub-interfaces. When the data processing apparatus is connected to a central site device through one optical fiber that has both receiving and transmitting functions, there is at least one synthesis interface; and when the data processing apparatus is connected to a central site device through one pair of optical fibers, where one optical fiber is used for reception and the other optical fiber is used for transmission, there is at least one pair of synthesis interfaces, where one synthesis interface is connected to a receiving optical fiber and the other synthesis interface is connected to a transmitting optical fiber.

The sub-interfaces and synthesis interfaces are not limited to a specific form, and any form is acceptable provided that the interfaces can transmit common public radio interface (CPRI) data.

102. The data processing apparatus aggregates the at least two data flows into one flow of output data.

The aggregating the at least two data flows into one flow of output data specifically includes: acquiring a rate for each data flow of the received at least two data flows and acquiring a sub-interface identity of each received data flow; when a sum of rates of the at least two data flows is lower than or equal to a preset threshold rate of synthetic data, carrying a sub-interface identity corresponding to each of the data flows in each of the data flows and aggregating the at least two data flows that carry their respective sub-interface identities into one flow of output data. The at least two data flows are synthesized into one flow of output data, where, in fact, each data flow of the at least two data flows is not changed and a rate of the synthetic output data is a sum of rates of the data flows before synthesis.

For example, if the preset threshold rate of synthetic data is 10 Gbps and the data processing apparatus receives 10 data flows, where a rate of each data flow is lower than or equal to 1 Gbps, the 10 data flows can be aggregated into one flow of synthetic data and the synthetic data is transmitted to the central site device through an optical fiber connected to the central site device.

In an implementation scenario, the central site device provides reference clock information to each remote base station during a data transmission process. The clock information mentioned in the embodiment of the present invention may be a frequency and a phase of a harmonic that carries data. The central site device controls clock information of remote base stations within the coverage of the central site device, and therefore the frequency and phase of a harmonic carrying data and transmitted by each remote base station are the same. However, because each signal flow has a different transmission distance, it is possible that there is a deviation in the phase of a harmonic transmitted by a remote base station. In this case, after the data processing apparatus receives at least two data flows, the data processing apparatus needs to first cache each of the data flows and acquire phases of harmonics carrying the at least two data flows and a reference harmonic phase provided by the central site device, and then adjust the phases of harmonics carrying the at least two data flows to the reference phase.

In an implementation scenario, when the sum of rates of the data flows is higher than the preset threshold rate of synthetic data, alarm information is generated, and the alarm information is sent to the central site device.

For example, if the preset threshold rate of synthetic data is 10 Gbps and the data processing apparatus receives 10 data flows, where a rate of each data flow is higher than 1 Gbps, the 10 data flows cannot be aggregated into one flow of synthetic data for transmission and information of such an exception needs to be sent to the central site device. In this case, the data processing apparatus generates alarm information and sends the generated alarm information to the central site device.

103. The data processing apparatus transmits the output data to the central site device.

The central site device provided in the embodiment of the present invention integrates one data processing apparatus that executes a process reverse to the process executed by the data processing apparatuses provided in the embodiments of the present invention. After the data processing apparatuses provided in the embodiments of the present invention aggregates at least two data flows into one flow of output data, the data processing apparatus in the central site device splits the aggregated output data for the central site device to recognize from which base stations the data is transmitted.

In practice, the central site device may integrate no data processing apparatus, it is feasible that an external data processing apparatus is mounted on the central site device and that the external data processing apparatus is enabled to communicate with the central site device.

In the embodiment of the present invention, the data processing apparatus receives at least two data flows transmitted from at least two remote base stations among the multiple remote base stations, aggregates the at least two data flows into one flow of output data and transmits the output data to the central site device. Compared with the prior art, the data transmission method provided in the embodiment of the present invention, where the data processing apparatus is connected to the central site device through one optical fiber or one pair of optical fibers, may reduce the required amount of optical fibers while implementing data transmission, in a situation where remote base stations are far (for example, hundreds of meters or even a few kilometers) from the central site device in a cloud radio access network.

Figure 10:
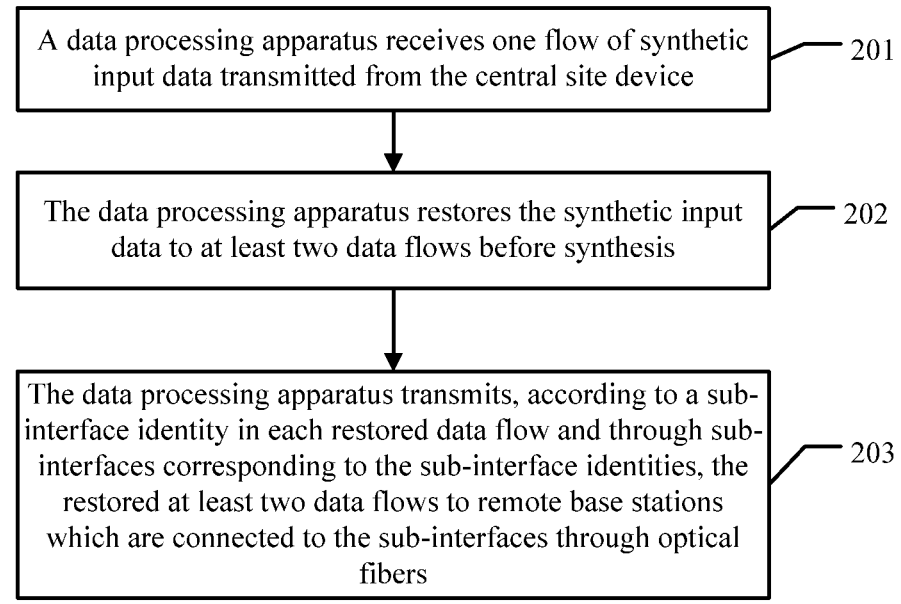
FIG. 10 is a schematic diagram of a data transmission method according to another embodiment of the present invention.

Refer to FIG. 10. From the perspective of data splitting, based on the foregoing data processing apparatuses, another embodiment of the data transmission method provided in the embodiments of the present invention includes the following steps.

201. A data processing apparatus receives one flow of synthetic input data transmitted from a central site device.

The central site device in the embodiment of the present invention integrates one data processing apparatus. When the central site device needs to transmit some data flows to different remote base stations, the integrated data processing apparatus first aggregates the data flows into one flow of output data according to the data synthesis process corresponding to FIG. 3, and then transmits the output data to a data processing apparatus connected to the central site device, and the data processing apparatus receives the synthetic input data transmitted from the central site device.

202. The data processing apparatus restores the synthetic input data to at least two data flows before synthesis.

The data processing apparatus integrated to the central site device is exactly the same as the data processing apparatuses provided in the embodiments of the present invention, and therefore, sub-interface identities of the data processing apparatus integrated to the central site device are the same as sub-interface identities of the data processing apparatus provided in the embodiments of the present invention.

The restoring the synthetic input data to at least two data flows before synthesis specifically includes: parsing the synthetic input data and acquiring a sub-interface identity in each data flow of the synthetic input data; and according to the sub-interface identities, restoring the synthetic input data to the at least two data flows before synthesis. In fact, the process of restoring synthetic data to data before synthesis does not change any of the data flows before synthesis but only restores a rate of each data flow to a rate before synthesis.

For example, if sub-interface identities of the data processing apparatus are 1, 2, 3, 4, 5, 6, 7, and 8, after the data processing apparatus receives the synthetic input data, the data processing apparatus parses the synthetic input data and acquires a sub-interface identity of each data flow in the synthetic input data; and if the acquired sub-interface identities are 1, 2, and 3, the data processing apparatus splits three data flows according to the three sub-interface identities.

203. The data processing apparatus transmits, according to a sub-interface identity in each restored data flow and through sub-interfaces corresponding to the sub-interface identities, the restored at least two data flows to remote base stations that are connected to the sub-interfaces through optical fibers.

Because optical fibers are connected to sub-interfaces, after data is split according to sub-interface identities, the data is transmitted from sub-interfaces corresponding to the sub-interface identities to remote base stations that are connected to the sub-interfaces through optical fibers.

In the embodiment of the present invention, the data processing apparatus receives one flow of synthetic input data transmitted from the central site device, restores the synthetic input data to at least two data flows before synthesis, and transmits, according to a sub-interface identity in each restored data flow and through sub-interfaces corresponding to the sub-interface identities, the restored at least two data flows to remote base stations that are connected to the sub-interfaces through optical fibers. Compared with the prior art, the data transmission method provided in the embodiment of the present invention, where the data processing apparatus is connected to the central site device through one optical fiber or one pair of optical fibers, may reduce the required amount of optical fibers while implementing data transmission, in a situation where remote base stations are very far (for example, hundreds of meters or even a few kilometers) from the central site device in a cloud radio access network.

Figure 11:
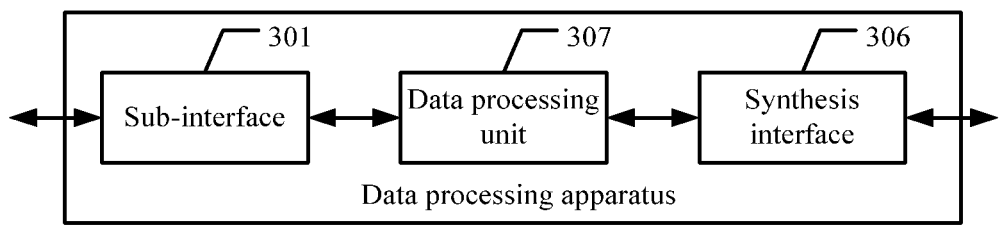
FIG. 11 is a schematic diagram of a data processing apparatus according to an embodiment of the present invention.

Referring to FIG. 11, one embodiment of the data processing apparatus provided in the embodiment of the present invention includes multiple or multiple pairs of sub-interfaces 301 and at least one synthesis interface 306 or one pair of synthesis interfaces 306, where each sub-interface 301 or each pair of sub-interfaces 301 has a unique sub-interface identity, each remote base station is connected to one sub-interface 301 or one pair of sub-interfaces 301 through one optical fiber or one pair of optical fibers, and a central site device is connected to one synthesis interface 306 or one pair of the synthesis interfaces 306 through one optical fiber or one pair of optical fibers.

The sub-interfaces 301 are configured to receive data transmitted from remote base stations that are connected to the sub-interfaces 301 through optical fibers.

A data processing unit 307 is configured to aggregate at least two data flows received by the at least two sub-interfaces 301 into one flow of output data.

The synthesis interface 306 is configured to transmit the output data synthesized by the data processing unit 307 to the central site device that is connected to the synthesis interface 306 through an optical fiber.

The synthesis interface 306 is further configured to receive one flow of synthetic input data transmitted from the central site device.

The data processing unit 307 is further configured to restore the synthetic input data received by the synthesis interface 306 to at least two data flows before synthesis.

The sub-interfaces 301 are further configured to transmit, according to a sub-interface identity in each restored data flow, the at least two data flows restored by the data processing unit 307 to remote base stations that are connected to the sub-interfaces through optical fibers.

In the embodiment of the present invention, for the multiple or multiple pairs of sub-interfaces 301 and the at least one synthesis interface 306 or one pair of synthesis interfaces 306, each sub-interface 301 or each pair of sub-interfaces 301 has a unique sub-interface identity, each remote base station is connected to one sub-interface 301 or one pair of sub-interfaces 301 through one optical fiber or one pair of optical fibers, and the central site device is connected to one synthesis interface 306 or one pair of the synthesis interfaces 306 through one optical fiber or one pair of optical fibers. The sub-interfaces 301 receive data transmitted from remote base stations that are connected to the sub-interfaces 301 through optical fibers. The data processing unit 307 aggregates at least two data flows received by the at least two sub-interfaces 301 into one flow of output data. The synthesis interface 306 transmits the output data synthesized by the data processing unit 307 to the central site device that is connected to the synthesis interface 306 through an optical fiber. The synthesis interface 306 receives one flow of synthetic input data transmitted from the central site device. The data processing unit 307 restores the synthetic input data received by the synthesis interface 306 to at least two data flows before synthesis. The sub-interfaces 301 transmit, according to a sub-interface identity in each stored data flow, the at least two data flows restored by the data processing unit 307 to remote base stations that are connected to the sub-interfaces 301 through optical fibers.

Figure 12:
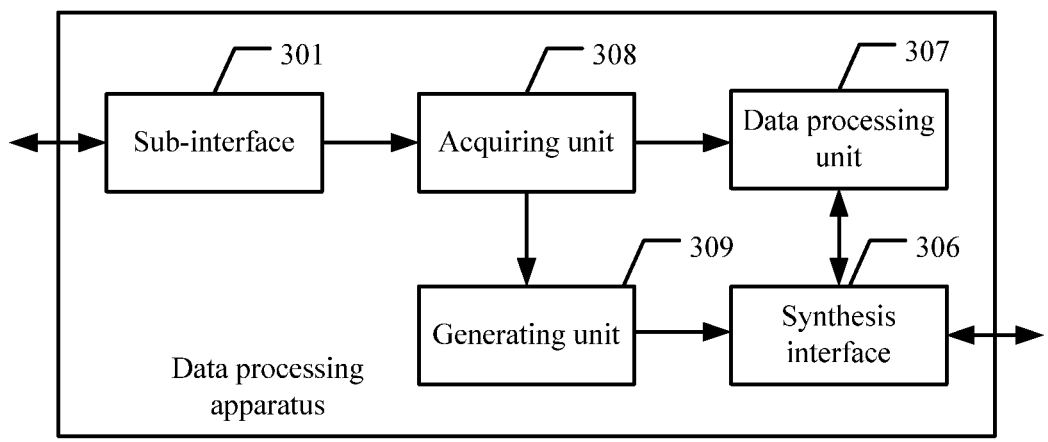
FIG. 12 is a schematic diagram of a data processing apparatus according to another embodiment of the present invention.

Referring to FIG. 12, based on the embodiment corresponding to FIG. 11, another embodiment of the data processing apparatus provided in the embodiments of the present invention further includes a number of units. A first acquiring unit 308 is configured to acquire a rate for each data flow of the at least two data flows received by at least two sub-interfaces 301, and acquire a sub-interface identity of each received data flow. The data processing unit 307 is specifically configured to, when a sum of rates of the at least two data flows acquired by the first acquiring unit 308 is lower than a preset threshold rate of synthetic data, carry a sub-interface identity corresponding to each data flow in each data flow and aggregate the at least two data flows that carry their respective sub-interface identities into one flow of output data. A generating unit 309 is configured to, when the sum of rates of the data flows acquired by the first acquiring unit is higher than the preset threshold rate of synthetic data, generate alarm information. The synthesis interface 306 is configured to send the alarm information generated by the generating unit 309 to the central site device.

In the embodiment of the present invention, the first acquiring unit acquires rates of data flows, and therefore the data flows can be correctly processed according to a sum of rates of the data flows; when the sum of rates of the data flows is higher than the threshold rate, alarm can be generated in time so as to facilitate maintenance and management.

Figure 13:
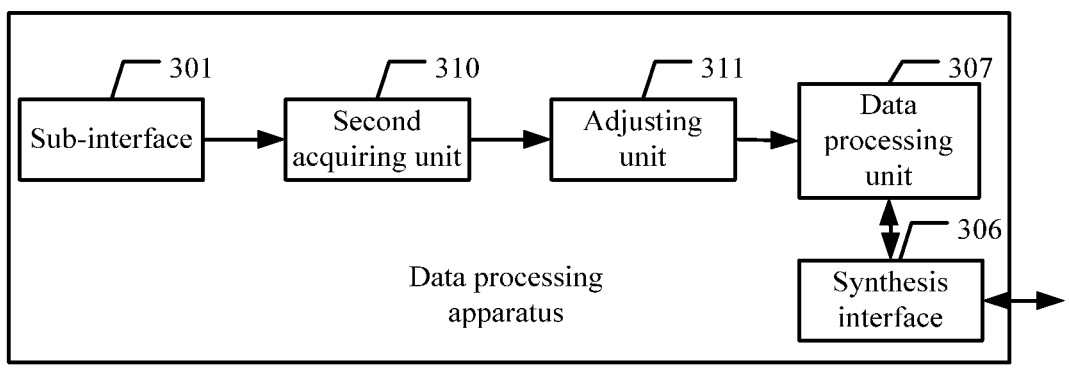
FIG. 13 is a schematic diagram of a data processing apparatus according to an embodiment of the present invention.

Referring to FIG. 13, based on the embodiment corresponding to FIG. 11, another embodiment of the data processing apparatus provided in the embodiments of the present invention further includes a second acquiring unit 310, configured to acquire phases of harmonics that carry the at least two data flows and a reference harmonic phase provided by the central site device; and an adjusting unit 31, configured to adjust the phases of harmonics that carry the at least two data flows and that are acquired by the second acquiring unit 310 to the reference phase.

After the second acquiring unit acquires a harmonic phase of each data flow, the adjusting unit adjusts, according to the reference phase, the harmonic phase of each data flow to the reference phase, so as to help subsequent data aggregation.

Figure 14:
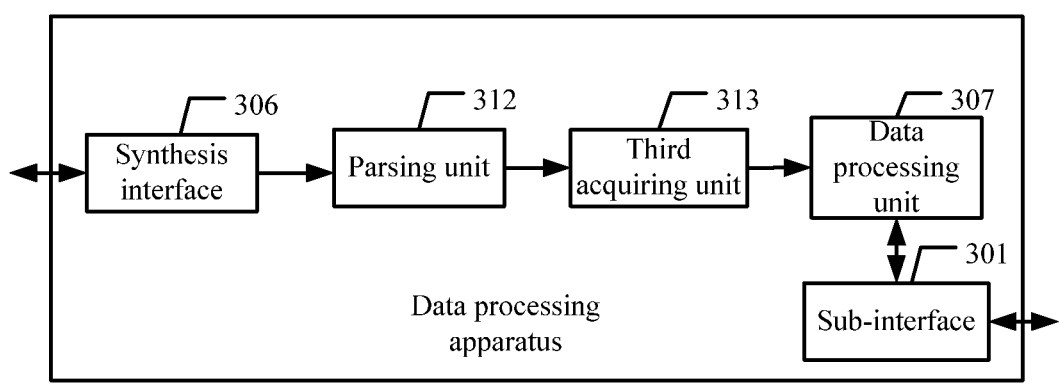
FIG. 14 is a schematic diagram of a data processing apparatus according to an embodiment of the present invention.

Referring to FIG. 14, based on the embodiment corresponding to FIG. 11, another embodiment of the data processing apparatus provided in the embodiments of the present invention further includes: a parsing unit 312, configured to parse the synthetic input data; and a third acquiring unit 313, configured to acquire a sub-interface identity of each data flow in the synthetic input data parsed by the parsing unit 312. The data processing unit 307 is specifically configured to restore, according to the sub-interface identities acquired by the third acquiring unit 313, the synthetic input data to the at least two data flows before synthesis.

In the embodiment, the third acquiring unit acquires a sub-interface identity of each data flow in the synthetic data parsed by the parsing unit and the data processing unit splits the data according to the sub-interface identities.

The data processing apparatuses provided in multiple embodiments of the present invention can reduce the required amount of optical fibers and reduce costs.

A person of ordinary skill in the art may understand that all or a part of the steps of the methods in the foregoing embodiments may be implemented by a program instructing relevant hardware. The program may be stored in a computer readable storage medium. The storage medium may include an ROM, an RAM, a magnetic disc, or an optical disc.

The data transmission methods, apparatuses and systems provided in the embodiments of the present invention have been described in detail. The principles and implementations of the present invention have been clarified in specific examples but the description of the embodiments is for the mere purpose of helping understand the methods and core spirit of the present invention. In addition, a person of ordinary skill in the art may still make variations to the specific implementations and application scope based on the spirit of the present invention. In conclusion, this specification shall not be construed as limitations on the present invention.

What is claimed is:

1. A data transmission method, wherein a data processing apparatus is connected to multiple remote base stations and one central site device, wherein the data processing apparatus is connected to each remote base station through one optical fiber or one pair of optical fibers, and the data processing apparatus is connected to the central site device through one optical fiber or one pair of optical fibers, and wherein the multiple remote base stations and the one central site device communicate using common public radio interface (CPRI) protocol, the method comprising:

receiving, by the data processing apparatus, a plurality data flows transmitted from at least two remote base stations among the multiple remote base stations, aggregating the plurality of data flows into one flow of output data, and transmitting the output data to the central site device; and receiving, by the data processing apparatus, one flow of synthetic input data transmitted from the central site device, restoring the synthetic input data to a plurality of data flows before synthesis, and transmitting, according to a sub-interface identity in each restored data flow and through sub-interfaces corresponding to the sub-interface identities, the restored plurality of data flows to remote base stations that are connected to the sub-interfaces through optical fibers;

wherein aggregating the data flows into one flow of output data comprises:

acquiring a rate for each data flow of the received plurality of data flows, and acquiring a sub-interface identity of each received data flow; and when a sum of rates of the plurality of data flows is lower than a preset threshold rate of synthetic data, carrying a sub-interface identity corresponding to each data flow in each data flow and aggregating the plurality of data flows that carry their respective sub-interface identities into the one flow of output data.

2. The method according to claim 1, wherein, before aggregating the data flows that carry their respective sub-interface identities into the one flow of output data, the method further comprises acquiring phases of harmonics that carry the plurality of data flows and a reference harmonic phase provided by the central site device, and adjusting the phases of harmonics that carry the plurality of data flows to the reference phase.

3. The method according to claim 1, wherein when the sum of rates of the data flows is higher than the preset threshold rate of synthetic data, the method further comprises generating alarm information, and sending the alarm information to the central site device.

4. The method according to claim 1, wherein restoring the synthetic input data to the plurality of data flows before synthesis comprises:

parsing the synthetic input data and acquiring a sub-interface identity of each data flow in the synthetic input data; and restoring, according to the sub-interface identity of each data flow, the synthetic input data to the plurality of data flows before synthesis.

5. A data processing apparatus, comprising:
a processor;
multiple or multiple pairs of sub-interfaces;
at least one synthesis interface or one pair of synthesis interfaces;
wherein each sub-interface or each pair of sub-interfaces has a unique sub-interface identity;
wherein each remote base station is connected to one sub-interface or one pair of sub-interfaces through one optical fiber or one pair of optical fibers;
wherein a central site device is connected to one synthesis interface or one pair of the synthesis interfaces through one optical fiber or one pair of optical fibers;
wherein the sub-interfaces are configured to receive data transmitted from remote base stations that are connected to the sub-interfaces through optical fibers;
wherein the processor is programmed to aggregate at least two data flows received by the multiple sub-interfaces into one flow of output data, wherein aggregating the at least two data flows comprises converting a received optical signal to an electrical signal and converting a serial signal to a parallel signal;
wherein the at least one synthesis interface is configured to transmit the output data synthesized by the processor to the central site device that is connected to the synthesis interface through an optical fiber;
wherein the synthesis interface is further configured to receive one flow of synthetic input data transmitted from the central site device;
wherein the processor is further programmed to restore the synthetic input data received by the synthesis interface to at least two data flows before synthesis;
wherein the sub-interfaces are further configured to transmit, according to a sub-interface identity in each restored data flow, the at least two data flows restored by the processor to remote base stations that are connected to the sub-interfaces through optical fibers; and
wherein the processor is further programmed to:
acquire phases of harmonics that carry the at least two data flows and a reference harmonic phase provided by the central site device; and
adjust the phases of harmonics that carry the at least two data flows and that are acquired to the reference phase.

6. The apparatus according to claim 5, wherein the processor is programmed to:

acquire a rate for each data flow of the received at least two data flows, and acquire a sub-interface identity of each received data flow; and when a sum of acquired rates of the at least two data flows is lower than a preset threshold rate of synthetic data, carry a sub-interface identity corresponding to each data flow in each data flow and aggregate the at least two data flows that carry their respective sub-interface identities into one flow of output data.

7. The apparatus according to claim 6, wherein the processor is programmed to generate alarm information when the sum of acquired rates of the data flows is higher than the preset threshold rate of synthetic data; and wherein the synthesis interface is configured to send the alarm information to the central site device.

8. The apparatus according to claim 5, wherein the processor is programmed to:

parse the synthetic input data;

acquire a sub-interface identity of each data flow in the parsed synthetic input data; and restore, according to the acquired sub-interface identities, the synthetic input data to the at least two data flows before synthesis.

9. A data transmission system, comprising:
a plurality of remote base stations;
a first data processing apparatus; and
a central site device that includes a second data processing apparatus;
wherein the plurality of remote base stations, the first data processing apparatus, and the central site device are configured to communicate according to common public radio interface (CPRI) protocol;
wherein the first data processing apparatus is connected to each remote base station through one optical fiber or one pair of optical fibers and the first data processing apparatus is connected to the central site device through one optical fiber or one pair of optical fibers;
wherein the first data processing apparatus is configured to receive at least two data flows transmitted from at least two remote base stations among the remote base stations, aggregate the at least two data flows into one flow of output data, and transmit the output data to the central site device;
wherein the second data processing apparatus is configured to receive the output data transmitted from the first data processing apparatus, restore the output data to the at least two data flows before synthesis, so as to implement communication between the central site device and the remote base stations;
wherein the second data processing apparatus is further configured to aggregate two data flows to be transmitted by the central site device to at least two remote base stations connected to the first data processing apparatus into one flow, and transmit the aggregated synthetic input data to the first data processing apparatus; and wherein the first data processing apparatus is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers;

wherein the first data processing apparatus being configured to aggregate the at least two data flows into one flow of output data comprises the first data processing apparatus being configured to:
  acquire a rate for each data flow of the at least two data flows, and acquire a sub-interface identity of each data flow; and
  when a sum of rates of the at least two data flows is lower than a preset threshold rate of synthetic data, carry a sub-interface identity corresponding to each data flow in each data flow and aggregate the at least two data flows that carry their respective sub-interface identities into one flow of output data.

10. A data transmission system, comprising:
a plurality of remote base stations;
a plurality of first data processing apparatuses; and
a central site device that includes a second data processing apparatus;
wherein each first data processing apparatus is connected to multiple remote base stations and each remote base station is connected to only one first data processing apparatus;
wherein each first data processing apparatus and a remote base station are connected through one optical fiber or one pair of optical fibers;
wherein each first data processing apparatus is connected to the central site device through one optical fiber or one pair of optical fibers;
wherein the first data processing apparatus is configured to receive at least two flows of data transmitted from at least two remote base stations among multiple remote base stations that are connected to the first data processing apparatus, aggregate the at least two data flows into one flow of output data, and transmit the output data to the central site device;
wherein the second data processing apparatus is configured to receive the output data transmitted from the first data processing apparatus, restore the output data to the at least two data flows before synthesis, so as to implement communication between the central site device and the remote base stations, wherein restoring the output data to the at least two data flows before synthesis comprises converting the received output data transmitted from the first data processing apparatus from an optical signal to an electrical signal, and restoring the at least two data flows from the electrical signal;
wherein the second data processing apparatus is further configured to aggregate two data flows, which are transmitted by the central site device to at least two remote base stations connected to one first data processing apparatus, into one flow, and transmit the aggregated synthetic input data to the first data processing apparatus connected to the at least two remote base stations; and
wherein the first data processing apparatus is further configured to receive the synthetic input data transmitted from the central site device, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers;

wherein the first data processing apparatus being configured to aggregate the at least two data flows into one flow of output data comprises the first data processing apparatus being configured to:
  acquire a rate for each data flow of the at least two data flows, and acquire a sub-interface identity of each data flow; and
  when a sum of rates of the at least two data flows is lower than a preset threshold rate of synthetic data, carry a sub-interface identity corresponding to each data flow in each data flow and aggregate the at least two data flows that carry their respective sub-interface identities into the one flow of output data.

11. A data transmission system, comprising:
a plurality of multiple remote base stations;
one first data processing apparatus;
one second data processing apparatus; and
one central site device;
wherein the second data processing apparatus is set externally to the central site device;
wherein a communication connection exists between the central site device and the second data processing apparatus;
wherein the first data processing apparatus is connected to each remote base station through one optical fiber or one pair of optical fibers;
wherein the first data processing apparatus is connected to the second data processing apparatus through one optical fiber or one pair of optical fibers;
wherein the first data processing apparatus is configured to receive at least two data flows transmitted from at least two remote base stations among the multiple remote base stations, aggregate the at least two data flows into one flow of output data, and transmit the output data to the second data processing apparatus;
wherein the second data processing apparatus is configured to receive the output data transmitted from the first data processing apparatus, restore the output data to the at least two data flows before synthesis, so as to implement communication between the central site device and the remote base stations;
wherein the second data processing apparatus is further configured to aggregate two data flows to be transmitted by the central site device to at least two remote base stations into one flow, and transmit the aggregated synthetic input data to the first data processing apparatus; and
wherein the first data processing apparatus is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers;

wherein the first data processing apparatus being configured to aggregate the at least two data flows into one flow of output data comprises the first data processing apparatus being configured to:
convert the at least two data flows from optical signals to electrical signals;
acquire a rate for each data flow of the at least two data flows, and acquire a sub-interface identity of each data flow;
when a sum of rates of the at least two data flows is lower than a preset threshold rate of synthetic data, synthesize the electrical signals to form a single data flow, wherein each of the at least two data flows in the signal data flows carries its respective sub-interface identity; and
convert the single data flow from an electrical signal to an optical signal to form the one flow of output data.

12. A data transmission system, comprising:
a plurality of remote base stations;
a plurality of first data processing apparatuses;
a single second data processing apparatus; and
a single central site device;
wherein the second data processing apparatus is set externally to the central site device;
wherein a communication connection exists between the central site device and the second data processing apparatus;
wherein each first data processing apparatus is connected to multiple remote base stations;
wherein each remote base station is connected to only one first data processing apparatus;
wherein each first data processing apparatus and a remote base station are connected through one optical fiber or one pair of optical fibers;
wherein each first data processing apparatus is connected to the second data processing apparatus through one optical fiber or one pair of optical fibers;
wherein each first data processing apparatus is configured to receive at least two data flows transmitted from at least two remote base stations among multiple remote base stations connected to the respective first data processing apparatus, aggregate the at least two data flows into one flow of output data, and transmit the output data to the second data processing apparatus;
wherein the second data processing apparatus is configured to receive the output data transmitted from each first data processing apparatus, restore the output data to the at least two data flows before synthesis, so as to implement communication between the central site device and the remote base stations, wherein restoring the output data to the at least two data flows before syntheses comprises converting an optical signal to an electrical signal and converting an electrical signal to an optical signal;
wherein the second data processing apparatus is further configured to aggregate two data flows to be transmitted by the central site device to at least two remote base stations connected to one first data processing apparatus into one flow, and transmit the aggregated synthetic input data to the one first data processing apparatus connected to the at least two remote base stations; and
wherein the one first data processing apparatus is further configured to receive the synthetic input data transmitted from the second data processing apparatus, restore the synthetic input data to the at least two data flows before synthesis, and transmit, according to a sub-interface identity in each restored data flow and through sub-interfaces corresponding to the sub-interface identities, the restored at least two data flows to the remote base stations that are connected to the sub-interfaces through optical fibers;
wherein each first data processing apparatus being configured to aggregate the at least two data flows into one flow of output data comprises the each first data processing apparatus being configured to:
convert the at least two data flows from optical signals to electrical signals;
synthesize the electrical signals to form a single data flow; and
convert the single data flow from an electrical signal to an optical signal to form the one flow of output data.

* * * * *